Dec. 26, 1944.　　R. S. ELBERTY, JR　　2,366,090
SERIES VARIABLE VOLTAGE DRIVE
Filed Nov. 11, 1941　　2 Sheets-Sheet 1

WITNESSES:

INVENTOR
Robert S. Elberty, Jr.
BY
Paul E. Friedemann
ATTORNEY

Dec. 26, 1944.   R. S. ELBERTY, JR   2,366,090
SERIES VARIABLE VOLTAGE DRIVE
Filed Nov. 11, 1941   2 Sheets-Sheet 2

WITNESSES:

INVENTOR
Robert S. Elberty, Jr.
BY
Paul E. Friedmann
ATTORNEY

Patented Dec. 26, 1944

2,366,090

UNITED STATES PATENT OFFICE 2,366,090

SERIES VARIABLE VOLTAGE DRIVE

Robert S. Elberty, Jr., Waynesboro, Pa., assignor to Landis Tool Company, Waynesboro, Pa.

Application November 11, 1941, Serial No. 418,622

6 Claims. (Cl. 172—239)

My invention relates to variable voltage drives, more particularly of the series type, which I designate series variable voltage drives, or briefly series drives.

Series variable voltage drives are not new, as indicated by the Fiske Patents Nos. 516,804 and 516,805, granted on March 20, 1894. However, series variable voltage drives utilizing series motors driven by series generators are possessed of characteristics so unfavorable that it is doubtful if a series variable voltage drive using series units has heretofore ever been operated satisfactorily. When applicant began to experiment with series drives he found that such series drives possessed at least three outstanding objectionable features; hunting, instability, and poor speed regulation.

By "hunting" as applied generally to a series drive, is meant a periodic (sometimes aperiodic) change in certain or several operating characteristics of the drive. When "hunting" has reference to the speed characteristic of the motor it, as a rule, means as alternate increase and decrease of the motor speed from the desired, or normally expected speed. If a motor in a series drive is used on a load that also increases with the speed, speed changes or hunting may result.

In a series type variable voltage drive, this condition is found to be caused by a high residual magnetism in the motor. This hunting may be eliminated by using a motor frame of magnetic material having a relatively low residual magnetism, or by increasing the air gap of the motor relative to its normal value, or by a combination of these.

Instability is indicated by power reversal and is caused by a motor residual or counter-voltage higher than that of the generator. This causes the motor to reverse the generator polarity at light loads. The generator then builds up in the reverse direction and the continuance of this reversal of polarity results in a rough or jerky performance of the motor. This condition is remedied by so designing the machines that the generator residual voltage is higher than the residual or counter-voltage of the motor at the highest speed and lightest load at which the motor is to be operated. This means that during regenerative operation, that is, when the motor intermittently becomes a generator, the residual voltage of the motor will be low enough relative to the voltage output of the generator to avoid building up the generator voltage in a reverse direction. This may be done by using a difference in magnetic materials in the two machines, or using a difference in the dimensions of the magnetic circuit in the two machines, or a combination of both. As will be brought out later, certain methods of connecting resistance in the motor and generator circuits will increase the effective residual voltage of the generator over that of the motor and thus also make for more stable operation.

Poor speed regulation is indicated by an increase in motor speeds as the load decreases, particularly at light loads. This is caused by a high residual magnetism in the generator. Such a condition may be corrected by using a magnetic material in the generator of low residual magnetism, or increasing the air gap over its normal value, or both. The residual magnetism in units which give satisfactory results ranges from two to four percent of the no-load saturated value and up to nearly twenty percent of the no-load saturated value, twenty percent being considered substantially normal.

By residual magnetism is meant the magnetic characteristics of a motor or generator frame when the machine is not in motion.

By residual voltage of a generator, or a motor acting as a generator, is meant any voltage generated in either machine when the machines are disconnected.

It is therefore an object of my invention to provide a variable voltage drive of the series type wherein objectionable performance characteristics are corrected.

It is a further object of my invention to provide a variable voltage drive of the series type composed of a motor and generator having low residual magnetism.

It is a further object of my invention to provide the generator with a higher residual magnetism than the motor.

It is a further object of my invention to provide, for such a series type variable voltage drive, a resistor connected in the motor and generator circuit to lower the effective residual back voltage of the motor and to raise the effective residual voltage of the generator.

Other objects and advantages will become more apparent from a study of the following specification and the accompanying drawings, in which.

Figure 1:
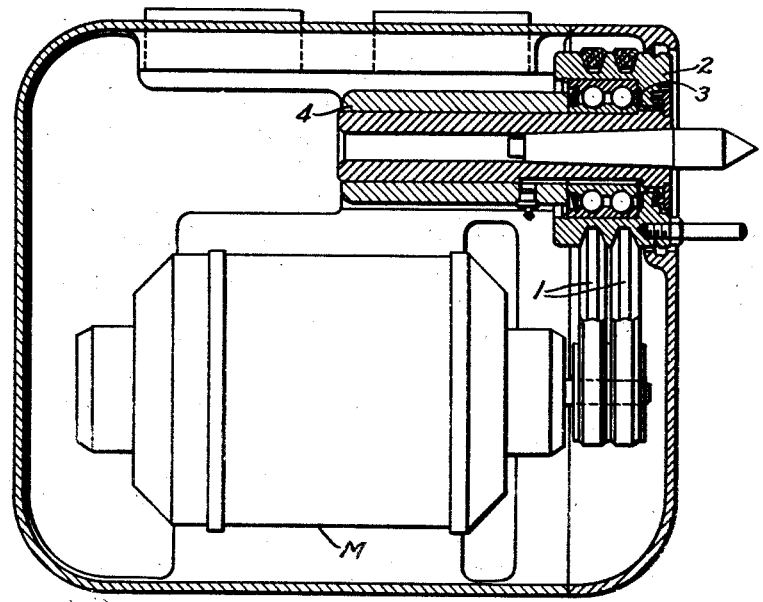
Figure 1 is a sectional view of an application of my invention to drive the headstock motor of a metal working machine.

In the drawings, letter M indicates a motor driving directly through belts 1 the headstock face plate 2. Said face plate is rotatably mounted in an anti-friction bearing 3 on a non-rotatable spindle 4.

Figure 2:
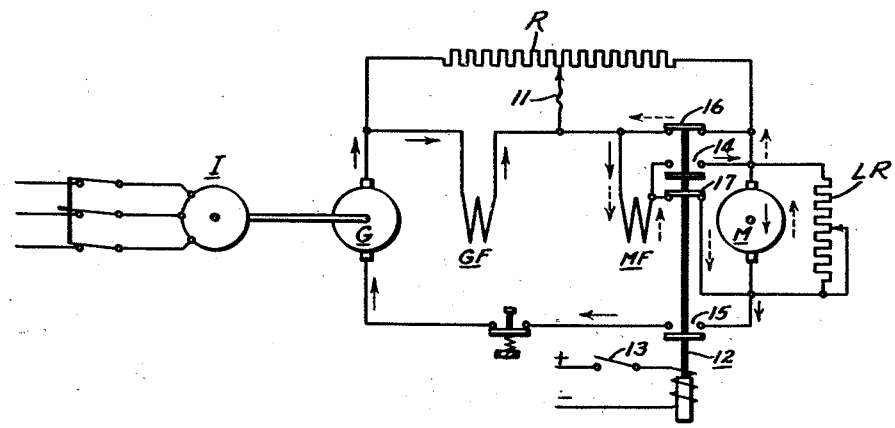
Figure 2 is a simplified wiring diagram showing the connections of parts in my invention.

Figure 2 shows a wiring diagram which includes motor M having a series wound field MF and a generator G having a series field GF. The magnetic material in the fields of both units is characterized by having a low residual magnetism. However, it has been found desirable to design the motor to have a lower residual than the generator so as to prevent instability in the operation of the drive. This can be accomplished by making the motor air gap 6 longer (see Fig. 3) than the generator air gap 5, or by increasing the area of the generator air gap over that of the motor as shown in Fig. 4, or by any other methods which affect residual magnetism of a motor or generator in the manner desired.

Improved starting may be attained by reducing the length of the generator air gap to a minimum and inserting a stabilizing, or load resistance LR in the motor circuit, preferably across the armature. This has the effect of placing a slight load on the generator when the motor is not running, thus increasing the voltage output of the generator and improving the starting characteristic of the drive.

Figure 3:
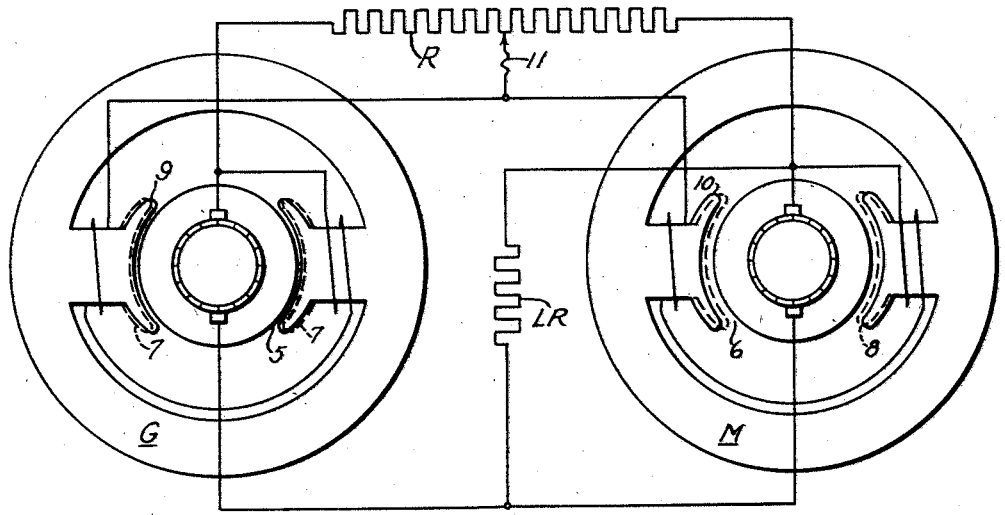
Figure 3 is a diagram showing the difference in air gaps of the motor and generator.
Figure 4:
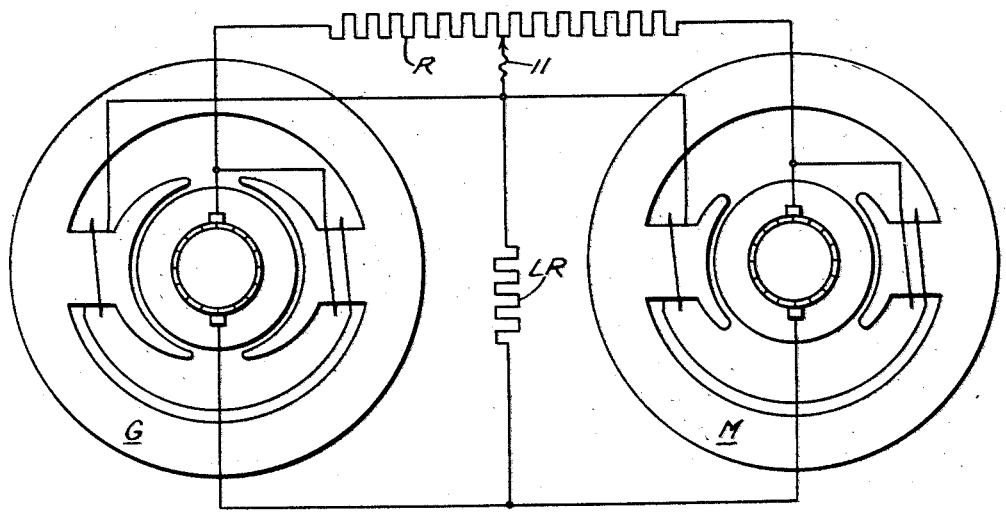
Figure 4 is a modification of my invention.

In Fig. 3 is shown diagrammatically the motor and generator as connected and used in this particular drive. The appearance of the airgap in both the motor and the generator has been exaggerated. The dotted lines 7 and 8 indicate the normal length of the air gaps of the generator and motor, respectively. The solid lines 9 and 10, showing one of my contributions to the art, indicate the relative length of air gaps in the generator and motor, respectively. It will be noted that the air gap of the generator is less than normal whereas the air gap of the motor is greater than normal. This has been done to increase the generator residual magnetism over that of the motor.

The reason for this is that it is desirable from the standpoint of cost to have motor and generator substantially identical in structure. This includes the magnetic material used. It has been found, however, that best results are obtained if the residual magnetism of the generator is greater than that of the motor. Units having magnetic circuits of the same material and the same dimensions have substantially the same residual magnetism. However, rather than have one magnetic material in the motor and another in the generator, I prefer to use the same magnetic material for both. Then the generator air gap may be shortened while at the same time lengthening the air gap of the motor, if necessary. Shortening the air gap of the generator makes it capable of giving greater power from a given frame size. Lengthening the air gap of the motor reduces the residual magnetism and thus improves stability and prevents hunting.

With the exception of the air gap dimensions, the motor and generator are substantially identical in construction.

The generator G may be driven by any suitable means such as an alternating current motor I.

The means for controlling the speed of the motor and the voltage output of the generator consists of an adjustable resistor R connected at a point between the motor field and the generator field. The resistance value, and thus the speed of the motor M, is adjusted by the shiftable lead 11. Thus the resistance change is effective on both fields.

With the stabilizing resistor LR connected as shown in Figs. 3 and 4, the current in the resistor circuit loads the generator to a small extent and the generator performs as required. This small load current tends to raise the generator voltage since this current passes through the generator field. Should the motor try to become a generator, this resistor adds to the load on the motor without raising the motor voltage since the current through the resistor does not, for the showing in Fig. 3, pass through the motor field. The effect of the resistor is to oppose any tendency for the motor to act as a generator, and to assist the generator in its function. This increases the stability of operation.

In the electrical circuit of this machine there is a start and stop relay 12 which may be energized by a limit switch 13, or any other suitable means. Said relay includes two normally open contacts 14 and 15 for connecting the motor and generator in a running circuit, and two normally closed contacts 16 and 17 for connecting said motor in a braking circuit. The path of current in the running circuit is indicated by the full-line arrows. The path of current in the braking circuit is indicated by the dotted-line arrows.

In the modification shown in Fig. 4 I show the air gaps of both the generator and motor of the same value, but I do obtain my improvement by making the pole face area the generator greater than that of the motor. The generator will thus have a higher residual than the motor and thus provide good speed regulation for the motor at low speeds and light loads.

The two embodiments I show of my invention are merely illustrative and are not to be taken in a limiting sense. My invention is, therefore, only to be limited by the scope of the claims hereto appended.

I claim:

1. An electrical circuit including a series motor and a series generator, said machines being of substantially the same rating means for controlling the output voltage of the generator whereby to control the speed of the motor, said motor and generator having air gaps of such dimensions as to produce a low residual voltage and maintain stability in the operation of the motor at light loads, the air gap of the motor being greater than that of the generator.

2. An electrical circuit including a series motor and a series generator, said machines being of substantially the same rating each constructed of material having a residual magnetism of not more than ten percent (10%) of the no-load saturation, means for controlling the output voltage of the generator whereby to control the speed of the motor, said motor and generator having air gaps of such dimensions as to produce a low generator voltage and a low residual counter-voltage of the motor to maintain stability in the operation of the motor at light loads, the air gap of the motor being greater than that of the generator.

3. An electrical circuit including a series motor having a low residual magnetism of not more than four percent with reference to its no-load saturation value, means for maintaining stability of operation including a series generator having a frame size and electrical characteristics substantially the same as that of the motor except that the residual magnetism is higher than that of the motor, said generator being connected in series circuit relation to said motor for operating same, the structure of said units as stated being substantially identical except that the air gap of the generator to get the lower residual magnetism has a greater area than that of the motor.

4. An electrical circuit including a series motor having a low residual magnetism of not more than four percent with reference to its no-load saturation value, means for maintaining stability of operation including a series generator having a frame size and electrical characteristics substantially the same as that of the motor except that the residual magnetism is higher than that of the motor, said generator being connected in series circuit relation to said motor for operating same, the structure of said units as stated being substantially identical except that the air gap of the generator has a larger area than that of the motor, and means for increasing the no load voltage of the generator including a resistance across the motor armature.

5. An electrical circuit including a series motor having a low residual magnetism with reference to its no-load saturation value, means for maintaining stability of operation including a series generator having a low residual magnetism that is higher than that of the motor, said generator being connected in series to said motor for operating the same, said motor series field and said generator series field being so proportioned relative to each other that an increase in motor load will cause a sufficient rise in generator output voltage to maintain the motor speed substantially constant, and a resistance across the armature of said motor to increase the no-load voltage of the generator.

6. An electrical circuit including a series motor and a series generator connected in series circuit relation, said machines being of substantially the same rating, means for controlling the voltage output of the generator whereby to control the speed of the motor, said motor and generator frames being constructed of material having a low residual magnetism, the residual magnetism of said motor being lowered still further by increasing the size of the air gap and the residual magnetism of the generator being slightly increased over that of the motor by reducing the size of the generator air gap.

ROBERT S. ELBERTY, JR.